United States Patent
Yang et al.

(10) Patent No.: US 10,310,179 B1
(45) Date of Patent: Jun. 4, 2019

(54) OPTICAL WAVEGUIDE AND METHOD FOR MANUFACTURING THE SAME

(71) Applicant: INDUSTRIAL TECHNOLOGY RESEARCH INSTITUTE, Hsinchu (TW)

(72) Inventors: Chih-Jen Yang, Taoyuan (TW); Li-Ting Huang, New Taipei (TW); Dong-Sen Chen, Zhudong Township (TW); Chyi-Ming Leu, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/857,121

(22) Filed: Dec. 28, 2017

(30) Foreign Application Priority Data

Dec. 27, 2017 (TW) .............................. 106146064 A

(51) Int. Cl.
  *G02B 6/12* (2006.01)
  *G02B 6/122* (2006.01)
  *C08F 2/44* (2006.01)
  *G02B 6/136* (2006.01)

(52) U.S. Cl.
  CPC ............ *G02B 6/12007* (2013.01); *C08F 2/44* (2013.01); *G02B 6/12002* (2013.01); *G02B 6/1221* (2013.01); *G02B 6/136* (2013.01)

(58) Field of Classification Search
  None
  See application file for complete search history.

(56) References Cited

U.S. PATENT DOCUMENTS

| 7,005,163 B2 | 2/2006 | Chen et al. |
| 7,803,896 B2 | 9/2010 | Chen et al. |
| 8,101,703 B2 | 1/2012 | Wu et al. |
| 8,652,430 B2 | 2/2014 | Yang et al. |

(Continued)

FOREIGN PATENT DOCUMENTS

| CN | 102127297 B | 8/2014 |
| TW | 200616509 A | 5/2006 |

(Continued)

OTHER PUBLICATIONS

Chang et al., "Synthesis and Optical Properties of Polyimide-Silica Hybrid Thin Films," Chem. Mater., vol. 14, No. 10, 2002 (Published on Web Sep. 6, 2002), pp. 4242-4248.

(Continued)

*Primary Examiner* — Sung H Pak
(74) *Attorney, Agent, or Firm* — Birch, Stewart, Kolasch & Birch, LLP

(57) ABSTRACT

An optical waveguide includes a lower clad layer, a core layer, and an upper clad layer, wherein the core layer is disposed between the lower clad layer and the upper clad layer. The lower clad layer has a composition including unetchable closed-loop polyimide and plate-shaped clay in a range of 20 wt %-60 wt %. The core layer has a composition including etchable closed-loop polyimide and plate-shaped clay in a range of 20 wt %-60 wt %. The upper clad layer has a composition including an organic material and plate-shaped clay in a range of 20 wt %-60 wt %. The core layer has a refractive index lager than that of the upper clad layer and the lower clad layer.

16 Claims, 5 Drawing Sheets

(56) References Cited

U.S. PATENT DOCUMENTS

| | | | |
|---|---|---|---|
| 8,674,011 B2 | 3/2014 | Leu et al. | |
| 8,865,826 B2 | 10/2014 | Su et al. | |
| 2010/0142883 A1* | 6/2010 | Kim | G02B 6/138 385/14 |
| 2013/0270591 A1* | 10/2013 | de Brouwer | H01L 23/293 257/98 |
| 2016/0168328 A1* | 6/2016 | Takiue | C09D 179/08 525/436 |
| 2017/0226052 A1* | 8/2017 | Su | C08G 69/00 |

FOREIGN PATENT DOCUMENTS

| | | |
|---|---|---|
| TW | I336790 B | 2/2011 |
| TW | 201433842 A | 9/2014 |
| TW | 201500433 A | 1/2015 |
| TW | 201506050 A | 2/2015 |
| TW | 201723035 A | 7/2017 |

OTHER PUBLICATIONS

Chang et al., "Synthesis and Optical Properties of Soluble Polyimide/Titania Hybrid Thin Films," Macromol. Mater. Eng., vol. 291, 2006, pp. 1521-1528.

Liou et al., "Highly flexible and optical transparent 6F-PI/TiO$_2$ optical hybrid films with tunable refractive index and excellent thermal stability," J. Mater. Chem., vol. 20, 2010 (First published as an Advance Article on the web Nov. 12, 2009), pp. 531-536.

Sakakibara et al., "Nonlinear Optical Waveguides Using Carbon Nanotube-Polyimide Composite Material," European Conference on Optical Communications, Sep. 24-28, 2006, 2 pages.

Shioda, "Fluorinated Polyimide Waveguide Fabricated Using Replication Process with Antisticking Layer," Jpn. J. Appl. Phys., vol. 41, Pt. 1, No. 3A, Mar. 2002, pp. 1379-1385 (8 pages total).

Taiwanese Office Action and Search Report for Taiwanese Application No. 106146064, dated Aug. 15, 2018.

* cited by examiner

OPTICAL WAVEGUIDE AND METHOD FOR MANUFACTURING THE SAME

This application claims the benefit of Taiwan application Serial No. 106146064, filed Dec. 27, 2017, the subject matter of which is incorporated herein by reference.

BACKGROUND

Technical Field

The disclosure relates to an optical waveguide and method for manufacturing the same, and more particularly to an optical waveguide including plate-shaped clay.

Description of the Related Art

Recently, the technology in the field of information communication has been rapidly developed. The optical communication technology having high-speed and high-density data communication has made a remarkable progress. The development of signal transmission components having the high speed and high capacity plays an important role. Optical signal processing and transmission are extremely important. An optical waveguide refers to a medium for guiding the light wave. In order to transmit the light in a desired direction, the optical waveguide achieves the effect of optical signal transmitting by using different materials, shapes, structures to form different refractive indexes.

The optical waveguide has an interface formed between a core layer and a clade layer and transmits light by being reflected by the interface. In light of today's demand for lightweight communication products, the development of optical waveguide which are light and have excellent optical transmission quality is imperative.

SUMMARY

The disclosure relates to an optical waveguide and method for manufacturing the same. According to an embodiment of the present disclosure, an optical waveguide is provided. The optical waveguide includes a lower clad layer, a core layer, and an upper clad layer, wherein the core layer is disposed between the lower clad layer and the upper clad layer. The lower clad layer has a composition including the unetchable closed-loop polyimide and the plate-shaped clay. The weight percentage of the plate-shaped clay of the lower clad layer is between 20 wt % and 60 wt %. The core layer has a composition including the etchable closed-loop polyimide and the plate-shaped clay. The plate-shaped clay of the core layer is between 20 wt % and 60 wt %. The upper clad layer has a composition including a polymer and the plate-shaped clay. The plate-shaped clay of the upper clade layer is between 20 wt % and 60 wt %. The core layer has a refractive index larger than that of the upper clad layer and the lower clad layer.

According to an aspect of the present disclosure, a method for manufacturing an optical waveguide is provided. The method includes the following steps. First, a lower clade layer is provided. Then, a core layer is coated on the lower clade layer. The core layer is etched. Thereafter, an upper clade layer is coated on the lower clade layer and covers the core layer. The lower clad layer has a composition including the unetchable closed-loop polyimide and the plate-shaped clay. The plate-shaped clay of the lower clade layer is between 20 wt % and 60 wt %. The core layer has a composition including the etchable closed-loop polyimide and the plate-shaped clay. The plate-shaped clay of the core layer is between 20 wt % and 60 wt %. The upper clad layer has a composition including a polymer and the plate-shaped clay. The plate-shaped clay of the upper clade layer is between 20 wt % and 60 wt %. The core layer has a refractive index lager than that of the upper clad layer and the lower clad layer.

The following description is made with reference to the accompanying drawings and embodiments.

DETAILED DESCRIPTION

The present disclosure relates to an optical waveguide and a method for manufacturing the optical waveguide. Since the optical waveguide in the present disclosure has a lower clade layer including an unetchable closed-loop polyimide and a plate-shaped clay, the plate-shaped clay can provide support between polyimide molecules, thereby enhancing the etching resistance of the lower clade layer, and multiple layers can be coated on the lower clade layer. Moreover, the closed-loop polyimide does not have to be treated in a high temperature process (eg. 300° C.). Therefore, yellowing may not be occurred in the optical waveguide to affect the light transmission, and the high optical transparency of the optical waveguide can be maintained.

FIG. 1A to FIG. 1F schematically illustrate sectional views of a method for manufacturing an optical waveguide according to one embodiment of the present disclosure.

Figure 1A:
FIG. 1A to FIG. 1F schematically illustrate sectional views of a method for manufacturing an optical waveguide according to one embodiment of the present disclosure.

Referring to FIG. 1A, a substrate 110 is provided. In the present embodiment, the substrate 110 can be a wafer.

Figure 1B:
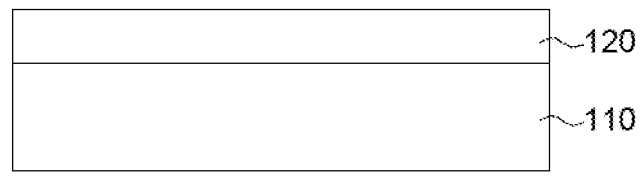

Referring to FIG. 1B, a lower clade layer 120 is coated on the substrate 110. In the present embodiment, the coating can be performed by a spin coating. A drying process can be performed after coating the lower clade layer 120. The temperature of the drying process can be between 60° C. and 250° C. The lower clade layer 120 can have a composition including an unetchable closed-loop polyimide and a plate-shaped clay, wherein the plate-shaped clay in the lower clade layer is between 20 wt % and 60 wt %. That is, the weight of plate-shaped clay of the lower clade layer is 20%-60% of the total weight of the lower clade layer. The unetchable closed-loop polyimide may have the following repeating unit of Formula 1:

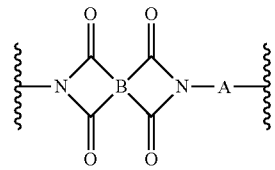

Formula 1

In Formula 1, A is

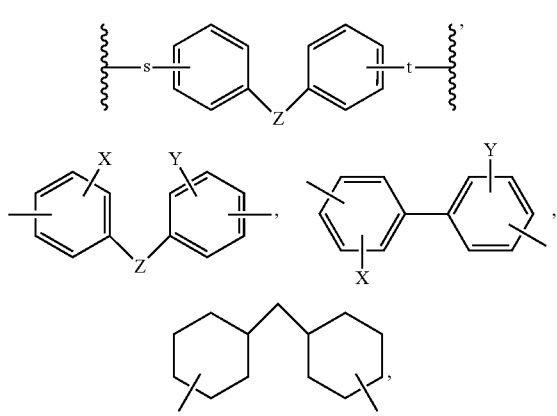

or

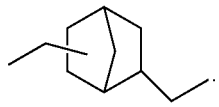

s and t are —O—Ar—, —CH$_2$—Ar—, —C(CH$_3$)$_2$—Ar—, or —SO$_2$—Ar—, respectively. Z is —O—, —(CR$_2$)$_m$—, —(CH$_2$)$_p$—C(CR$_3$)$_2$—(CH$_2$)$_q$— or —SO$_2$—. R is hydrogen (H) or fluorine (F). m, p and q are integers of 0-10. X and Y are hydrogen (H), C$_1$-C$_{10}$ alkyl, trifluoromethyl, hydroxy, C$_1$-C$_{10}$ alkoxy, halogen, —O—Ar, —CH$_2$—Ar, —C(CH$_3$)$_2$—Ar, or —SO$_2$—Ar, respectively. In one embodiment, A has following structures:

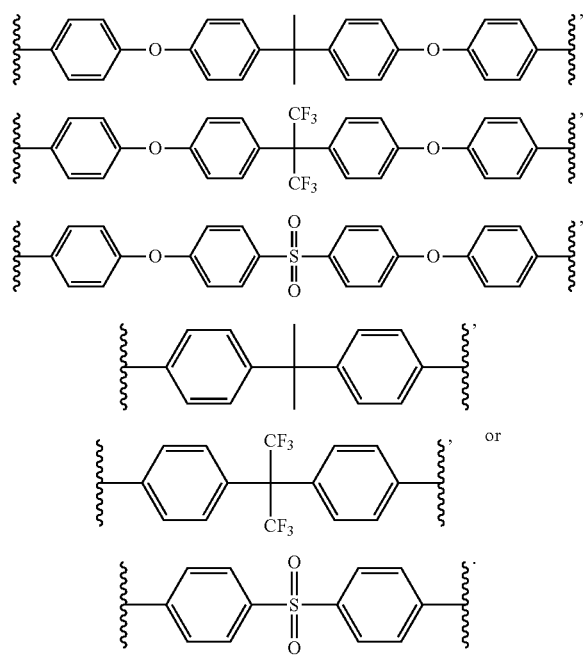

In Formula 1, B is

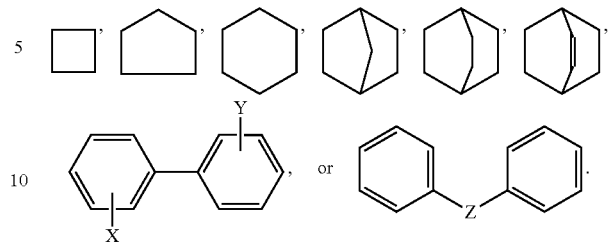

X and Y are H, C$_1$-C$_{10}$ alkyl, trifluoromethyl, C$_1$-C$_{10}$ alkoxy, halogen, respectively. Z is —O—, —(CR$_2$)$_m$—, —(CH$_2$)$_p$—C(CR$_3$)$_2$—(CH$_2$)$_q$—, —SO$_2$—, —Ar—O—Ar—, —Ar—CH$_2$—Ar—, —Ar—C(CH$_3$)$_2$—Ar—, or —Ar—SO$_2$—Ar—. R is H or F. m, p and q are integers of 0-10. Ar is a benzene ring.

In the present embodiment, the particle diameter (or size) of the plate-shaped clay is between 5 and 500 nanometers (nm), preferably between 20 nm and 300 nm. In one embodiment, the ratio of the diameter to the thickness of the plate-shaped clay is preferably not less than 10, preferably between about 50 and 10,000. The plate-shaped clay may be negatively charged cation-exchanged clays or positively charged anion-exchanged clays, and the ion exchange equivalent thereof ranges from 50 to 200 meq/100 g, for example, but not limited thereto. The plate-shaped clay that are suitable for use in the present disclosure includes (but are not limited to) smectite clay, vermiculite, halloysite, sericite, mica, synthetic mica, synthetic layered double hydroxide (LDH), synthetic smectite clay (such as the SWN in Cope Chemical) . . . etc. The smectite clay is, for example, montmorillonite, saponite, beidellite, nontronite, hectorite, stevensite . . . etc. The above-mentioned plate-shaped clay can be used alone or in combination In the present disclosure, an organic dispersion (i.e. organosol) of the plate-shaped clay is used in the reaction. The organic solvent is, for example, N-methyl-2-pyrrolidone (NMP), N, N-dimethylacetamide (DMAc), γ-butyrolactone (GBL), N, N-dimethyl formamide (DMF), Dimethyl sulfoxide (DMSO), Xylene, Toluene, or combinations thereof. The organic dispersion can be converted from an aqueous dispersion (water sol). In one embodiment, the plate-shaped clay may be dispersed in water to form an aqueous dispersion and the aqueous dispersion passes through a column filled with cation and anion exchange resin, respectively, and the ratio of the cation exchange resin to the anion exchange resin (eg. 1:1) is adjusted to prepare a deionized aqueous dispersion. After that, an organic solvent and a volatile solvent are added to perform the co-distillation to remove the water content, and the organic dispersion of the plate-shaped clay can be formed. The solid content of the organic dispersion liquid is preferably 1 wt % to 20 wt %, more preferably 5 wt % to 10 wt %.

Figure 1C:
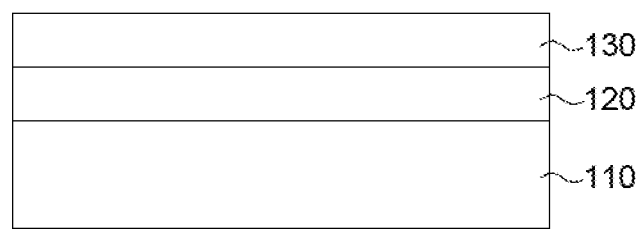
Figure 1D:
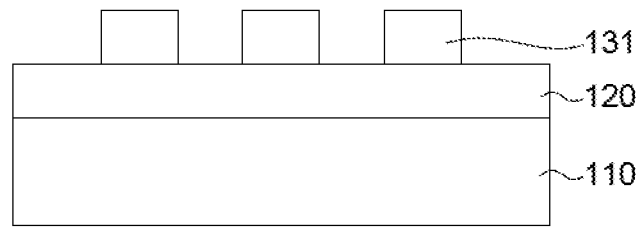

Referring to FIG. 1C, a core layer 130 is coated on the lower clade layer 120. In the present embodiment, coating can be performed by a spin coating. A drying process may be performed after the core layer 130 is coated. The temperature of the drying process is between 60° C. and 250° C. The core layer has a composition including an etchable closed-loop polyimide and a plate-shaped clay. The plate-shaped clay of the core layer is between 20 wt % and 60 wt %. That is, the weight of the plate-shaped clay of the core layer 130 is 20% to 60% of the total weight of the core layer 130. The plate-shaped clay of the core layer 130 may also be formed by the organic dispersion of the plate-shaped clay in the method described above. The difference between the etchable closed-loop polyimide in the core layer 130 and the unetchable closed-loop polyimide in the lower clade layer 120 is that A is a monomer having a hydroxyl group in the etchable closed-loop polyimide in the core layer 130.

In one embodiment, the etchable closed-loop polyimide in the core layer 130 may have the following repeating unit of Formula 2:

Formula 2

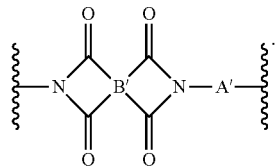

In Formula 2, A' is

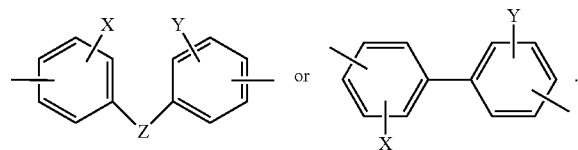

X' and Y' are H, $C_1$-$C_{10}$ alkyl, trifluoromethyl, hydroxy, alkoxy, halogen, —O—Ar, —$CH_2$—Ar, —$C(CH_3)_2$—Ar, or —$SO_2$—Ar, respectively. Z' is —O—, —$(CR_2)_m$—, —$(CH_2)_p$—$C(CR_3)_2$—$(CH_2)_q$— or —$SO_2$—, and at least one of X' and Y' is hydroxyl. R is H or F. m, p and q are integers of 0-10. B' is

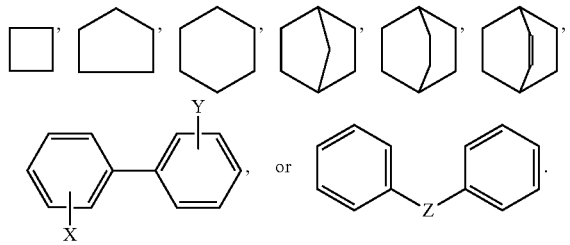

X and Y are H, $C_1$-$C_{10}$ alkyl, trifluoromethyl, hydroxy, $C_1$-$C_{10}$ alkoxy, halogen, respectively. Z is —O—, —$(CR_2)_m$—, —$(CH_2)_p$—$C(CR_3)_2$—$(CH_2)_q$—, —$SO_2$—, —Ar—O—Ar—, —Ar—$CH_2$—Ar—, —Ar—$C(CH_3)_2$—Ar—, or —Ar—$SO_2$—Ar—. R is H or F. m, p and q are integers of 0-10. Ar is a benzene ring. In one embodiment, A' has the following structures:

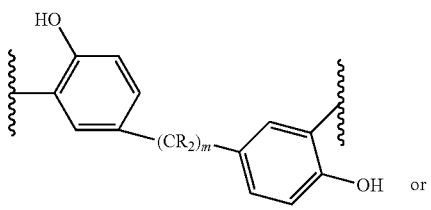

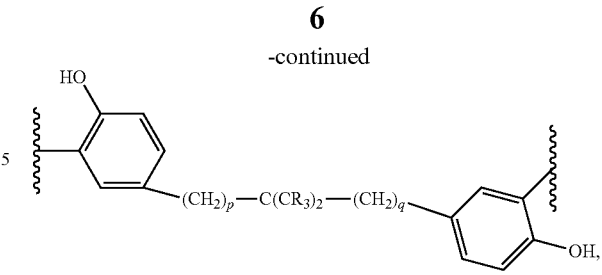

wherein R is H or F. m, p and q are integers of 0-10.
In Formula 2, B' is

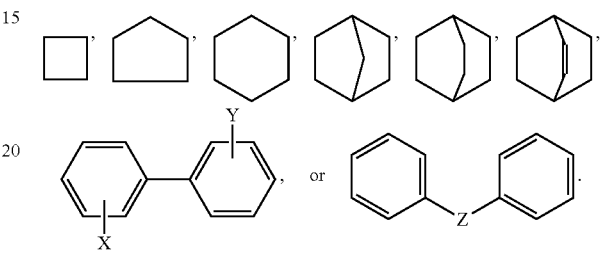

X and Y are H, $C_1$-$C_{10}$ alkyl, trifluoromethyl, hydroxy, alkoxy, halogen, respectively. Z is —O—, —$(CR_2)_m$—, —$(CH_2)_p$—$C(CR_3)_2$—$(CH_2)_q$—, —$SO_2$—, —Ar—O—Ar—, —Ar—$CH_2$—Ar—, —Ar—$C(CH_3)_2$—Ar— or —Ar—$SO_2$—Ar—. R is H or F. m, p and q are integers of 0-10. Ar is a benzene ring.

In one embodiment, the etchable closed-loop polyimide in the core layer 130 may have the following repeating unit of Formula 3:

Formula 3

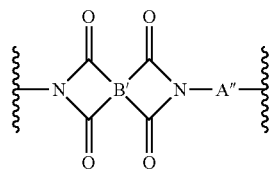

In Formula 3, A" is

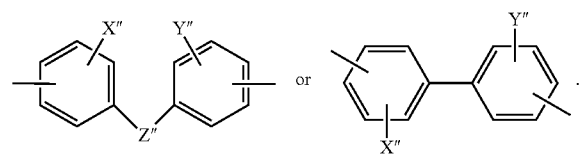

X" and Y" are H, $C_1$-$C_{10}$ alkyl, trifluoromethyl, hydroxy, $C_1$-$C_{10}$ alkoxy, halogen, —O—Ar, —$CH_2$—Ar, —$C(CH_3)_2$—Ar, or —$SO_2$—Ar, respectively. Z" is —O—, —$(CR_2)_m$—, —$(CH_2)_p$—$C(CR_3)_2$—$(CH_2)_q$— or —$SO_2$—. R is H or F. m, p and q are integers of 0-10.

In Formula 3, B' is

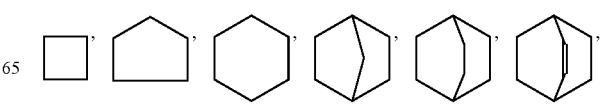

-continued

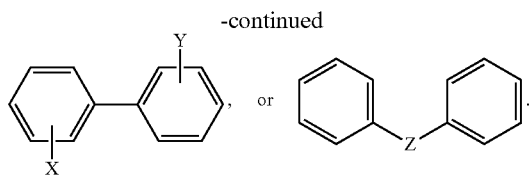

X and Y are H, $C_1$-$C_{10}$ alkyl, trifluoromethyl, hydroxy, $C_1$-$C_{10}$ alkoxy, halogen, respectively. Z is —O—, —(CR$_2$)$_m$—, —(CH$_2$)$_p$—C(CR$_3$)$_2$—(CH$_2$)$_q$—, —SO$_2$—, —Ar—O—Ar—, —Ar—CH$_2$—Ar—, —Ar—C(CH$_3$)$_2$—Ar—, or —Ar—SO$_2$—Ar—. R is H or F. m, p and q are integers of 0-10. Ar is a benzene ring.

Referring to FIG. 10, the core layer 130 is patterned to form a core layer 131 by an etching process. The etching process is, for example, a wet etching process. Since the unetchable closed-loop polyimide is selected to be used in the lower clade layer and the plate-shaped clay can provide support between polyimide molecules, it is possible to enhance the characteristics of the resistance to chemical solvents (eg. etchant) of the lower clade layer 120, and the lower clade layer 120 is less susceptible to chemical damage caused by chemical solvents. Therefore, different chemical solvents can still be applied to the lower clade layer 120, and the lower clade layer 120 has sufficient chemical resistance and is not susceptible to produce cracks even when multiple layers are applied.

Figure 1E:
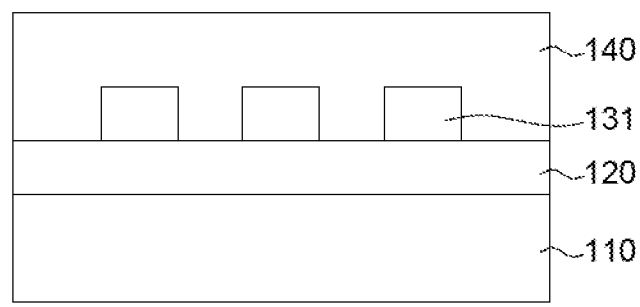

Referring to FIG. 1E, an upper clade layer 140 is coated on the lower clade layer 120 and covers the core layer 131. In other words, the core layer 131 may be disposed between the upper clade layer 140 and the lower clade layer 120. After coating the upper clade layer 140, a drying process can be performed. The temperature of the drying process is between 60° C. and 250° C. In an embodiment, the upper clade layer 140 includes a polymer and a plate-shaped clay. The weight percentage of the plate-shaped clay of the upper clade layer 140 is between 20% and 60%. That is, the weight of the plate-shaped clay of the upper clade layer 140 is 20%-60% of the total weight of the upper clade layer 140. The polymer of the upper clade layer 140 may be selected from the group consisting of the closed-loop polyimide, epoxy, poly (acrylic acid), poly (methacrylic acid), poly (cyclic olefin), polysiloxane, and polyamide imide. In an embodiment, the upper clade layer 140 and the lower clade layer 120 may be formed of the same material.

Figure 1F:
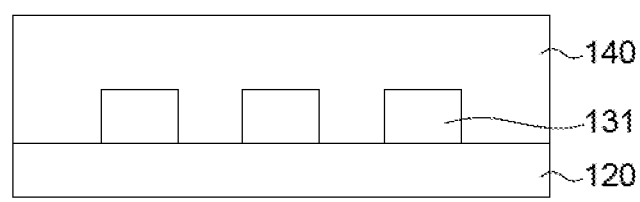

Referring to FIG. 1F, the substrate 110 is removed, and an optical waveguide 10 is formed. The optical waveguide 10 includes the lower clade layer 120, the core layer 131 disposed on the lower clade layer 120, and upper clade layer 140 disposed on the lower clade layer 120 and covering the core layer 131. The content of the plate-shaped clay in the core layer 131 may be lower than the content of the plate-shaped clay in the upper clade layer 140 and the content of the plate-shaped clay in the lower clade layer 120, respectively, such that the refractive index of the core layer 131 is larger than the refractive index of the upper clade layer 140 and the refractive index of the lower clade layer 120. The difference between the refractive index of the lower clade layer 120 and the refractive index of the core layer 131 is between 1 and 0.1.

Embodiments 1 to 7 are described below in order to describe the present disclosure in more detail, but the disclosure is not limited thereto. In Embodiments 1 to 7, unless otherwise specified, % represents the weight percentage (wt %).

Embodiment 1—Preparation of the Plate-Shaped Clay Solution (CL)

After gradually adding 30 g of clay (Laponite RDS, disc-shaped, average diameter 25 nm, average thickness 0.92 nm) into 970 g of deionized water, a light blue transparent solution having 3% of the plate-shaped clay is obtained. The resulting aqueous dispersion sequentially passes through a column filled with 300 g of an H-form cation ion-exchange resin (Dowex Marathon MSC H form) and 300 g of an OH-form anion ion-exchange resin (Dowex Marathon A OH form) (both using a ratio of 1:1), to get 960 g of aqueous dispersion having 1.8% of deionized plate-shaped clay. After that, 1440 g of isopropanol and 415 g of γ-butyrolactone (GBL) are further added, and they are uniformly mixed, and water and isopropanol are removed by distillation under a reduced pressure to obtain a plate-shaped clay dispersion in γ-butyrolactone, referred to as a plate-shaped clay solution (CL). The plate-shaped clay solution has an inorganic solid content of 3.79%.

Embodiment 2—Preparation of an Etchable Closed-Loop Polyimide Solution (BO)

0.03 moles of 2,2-bis (3-amino-4-hydroxyphenyl) hexafluoropropane and 0.03 moles of 4,4'-oxydianiline are dissolved in 120 g of N-methylpyrrolidone (NMP) by using a three-necked flask and purged with nitrogen at room temperature. After completely dissolved, 0.06 moles of bicyclo [2.2.2] oct-7-ene-2, 3, 5, 6-tetracarboxylic dianhydride (B1317) is added. Then, the stirring is continued for 1 hour until it is completely dissolved to form a polyamic acid solution in a viscous state. After heating to 220° C. for 3 hours, the water is removed by using the water removal device during the reaction process, and the yellow viscous liquid, i.e. the etchable closed-loop polyimide, can be finally obtained, wherein the solid content of the etchable closed-loop polyimide solution (BO) is 20.06% (the average molecular weight is between 100,000 and 200,000), as shown in the following Formula 4:

Formula 4

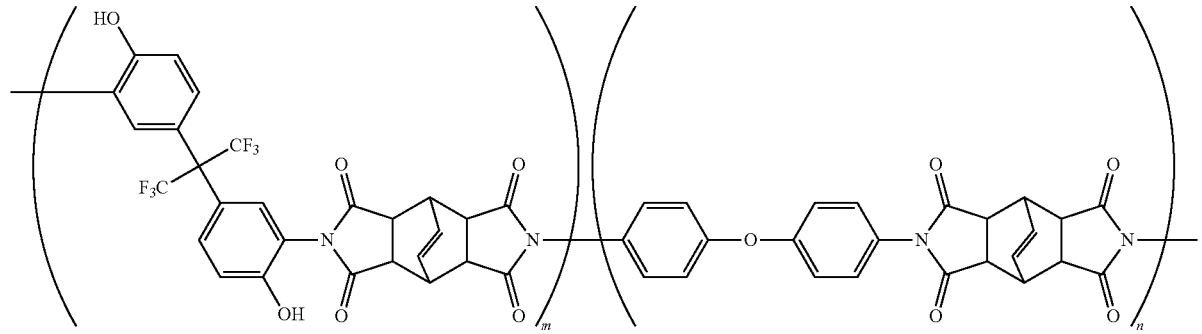

Embodiment 3—Preparation of an Unetchable Closed-Loop Polyimide (BB)

0.0147 moles of 2,2-bis [4-(4-aminophenoxy) phenyl] propan (BAPPm) monomer is dissolved in 32.94 g of m-cresol and 0.015 moles of B1317 is added until BAPPm is completely dissolved. After B1317 is completely dissolved, the stirring is continued for an hour, and a viscous polyimide solution is formed. The mixture is then heated to 220° C. for 3 hours, and the water is simultaneously removed by a water removal device during the reaction process. Then, the resulting reaction solution is dripped into methanol to precipitate the polyarylimide and dried in a vacuum oven for 12 hours. After that, polyimide is dissolved in dimethylethanolamine (DMAc) to get an unetchable closed-loop polyimide solution (BB) (average molecular weight is between 100,000 and 200,000) having a solid content of 20%, as shown in the chemical formula shown in the following formula 5:

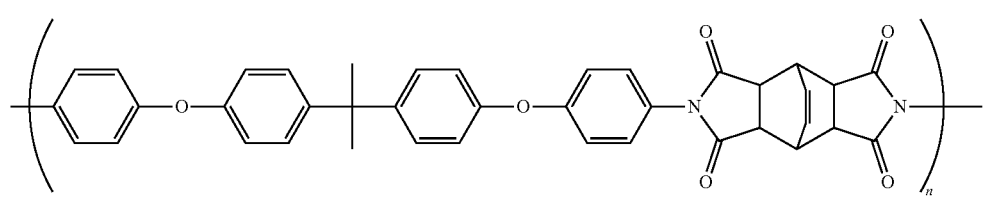

Formula 5

Embodiment 4—a Chemical Resistance Test of the Material of the Optical Waveguide 10.10 g of an etchable closed-loop polyimide (BO, Embodiment 2), 0.23 g of the plate-shaped clay solution (CL, Embodiment 1), and 12.10 g of gamma-butyrolactone ester (GBL) are mixed to form a first material. 10.45 g of the etchable closed-loop polyimide, 13.82 g of the plate-shaped clay solution and 8.46 g of GBL are mixed to form a second material. Next, the first material is coated on a wafer by a spin coating process (coating at 500 rpm for 10 seconds followed by 1000 rpm for 10 seconds) to form a first layer on the wafer. After that, the first layer was subjected to a drying process, baking at 65° C. for 15 minutes first, and then baking at 150° C. for 15 minutes, and finally baking at 220° C. for 1 hour. Thereafter, after applying the second material onto the dried first layer by the above-mentioned spin coating process, the second layer is dried to form the second layer on the first layer, thus obtaining the optical waveguide material of an Embodiment 4-1 having the first layer disposed on the wafer and the second layer disposed on the first layer. In the first layer of the Embodiment 4-1, the weight percentage of BO is 90%, and the weight percentage of CL is 10%. In the second layer of the Embodiment 4-1, the weight percentage of BO is 80%, and the weight percentage of CL is 20%.

The material of the optical waveguide of Embodiments 4-2 to 4-6 are prepared according to the similar process of Embodiment 4-1 described above. The Embodiment 4-2 has the difference from the Embodiment 4-1 in that the first layer has 80 wt % of BO and 20 wt % of CL, and the second layer has 90 wt % of BO and 10 wt % of CL. The Embodiment 4-3 has the difference from the Embodiment 4-1 in that the second layer has 90 wt % of BO and 10 wt % of CL. The Embodiment 4-4 has the difference from the Embodiment 4-1 in that the first layer has 80 wt % of BO and 20 wt % of CL. The Embodiment 4-5 has the difference from the Embodiment 4-1 in that BB is selected to be used in the first and second layers, but not BO. In the first layer of Embodiment 4-5, BB is 80 wt % and CL is 20 wt %. In the second layer of Embodiment 4-5, BB is 80 wt % and CL is 20 wt %. The Embodiment 4-6 has the difference from Embodiment 4-5 in that the first layer does not contain CL (Embodiment 1), and only contains BB (Embodiment 3). That is, the weight percentage of BB of the first layer in Embodiment 4-6 is 100%. The following Table 1 shows the results of the test of the chemical resistance of the optical waveguide materials of Embodiments 4-1 to 4-6. If the optical waveguide material produces a crack after the second layer is coated on the first layer, it indicates that the first layer may not withstand the chemical resistance of applying the second layer.

TABLE 1

| Embodiment | Composition of the first layer (wt %) | Composition of the second layer (wt %) | crack |
| --- | --- | --- | --- |
| 4-1 | 90% BO + 10% CL | 80% BO + 20% CL | Yes |
| 4-2 | 80% BO + 20% CL | 90% BO + 10% CL | No |
| 4-3 | 90% BO + 10% CL | 90% BO + 10% CL | Yes |
| 4-4 | 80% BO + 20% CL | 80% BO + 20% CL | No |
| 4-5 | 80% BB + 20% CL | 80% BB + 20% CL | No |
| 4-6 | 100% BB | 80% BB + 20% CL | Yes |

From the results of Table 1, it can be seen that either BO or BB is used in the first layer, the chemical resistance to the second layer can be enhanced if 20 wt % CL is included in the first layer (Embodiments 4-2, 4-4 and 4-5), and no crack may be produced in the optical waveguide material. In the first layer of the Embodiment 4-6, since CL is not included in the first layer, the first layer may not have chemical resistance to the second layer, and produces a crack. In the Embodiments 4-1 and 4-3, 10% of CL is still not enough to have the chemical resistance to the second layer, and the cracks may be observed.

Embodiment 5—Preparation of the Material of the Optical Waveguide and the Measurement of Refractive Index The optical waveguide material layers of Embodiments 5-1 to 5-4 are formed according to the formulation of Table 2 below. Next, the optical waveguide material layer is coated on a wafer by a spin coating process similar to that of Embodiment 4 described above. After that, the optical waveguide material layer is dried by a drying process similar to that of Embodiment 4 described above. Referring to Table 2 and FIG. 2, the measurement results of the refractive index in the wavelength of 1300 nanometers (nm) for the dried optical waveguide material layers of Embodiments 5-1 to 5-4, together with the wafer, are shown.

TABLE 2

| Embodiments | 5-1 | 5-2 | 5-3 | 5-4 |
|---|---|---|---|---|
| wt % of CL | 0 | 20 | 30 | 35 |
| weight of BO (g) | 10 | 10.45 | 8.52 | 6.92 |
| weight of CL (g) | 0 | 13.82 | 19.33 | 19.72 |
| weight of GBL (g) | 15 | 8.46 | 2.66 | 0.05 |
| refractive index (1300 nm) | 1.5442 | 1.5375 | 1.5305 | 1.5219 |

Figure 2:
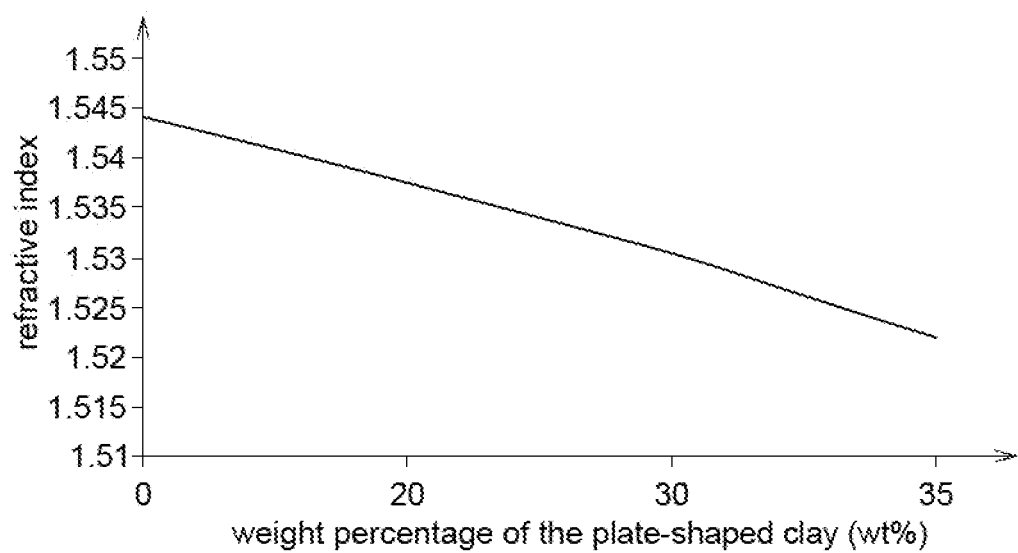
FIG. 2 schematically illustrates the relationship between the amount of the plate-shaped clay and the refractive index in an optical waveguide material layer according to one embodiment of the present disclosure.

As can be seen from the results of Table 2 and FIG. 2, as the adding amount of the plate-shaped clay is higher, the refractive index becomes lower and the amount of plate-shaped clay shows a linear relationship with the refractive index, indicating that the refractive index of the optical waveguide material layer can be adjusted by the addition of the plate-shaped clay.

Embodiment 6—an Etching Test of the Material Layer of the Optical Waveguide

Figure 3A:
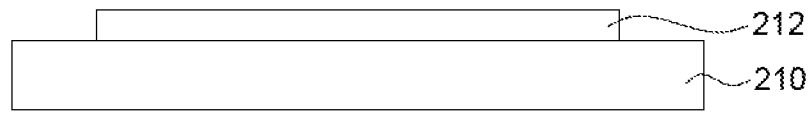
FIG. 3A to FIG. 3G schematically illustrate sectional views of a method for manufacturing an optical waveguide according to further embodiment of the present disclosure.
Figure 3B:
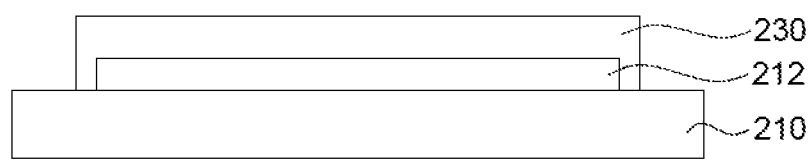
Figure 3C:
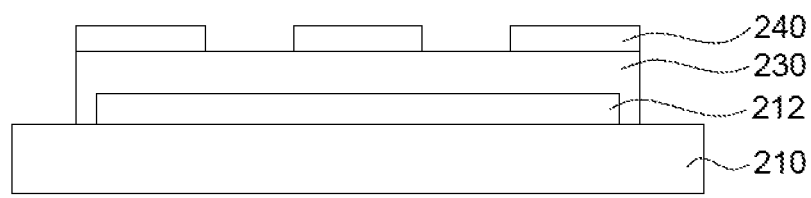
Figure 3D:
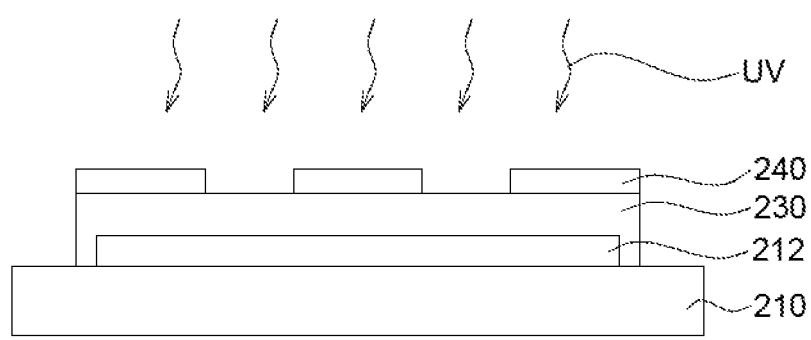
Figure 3E:
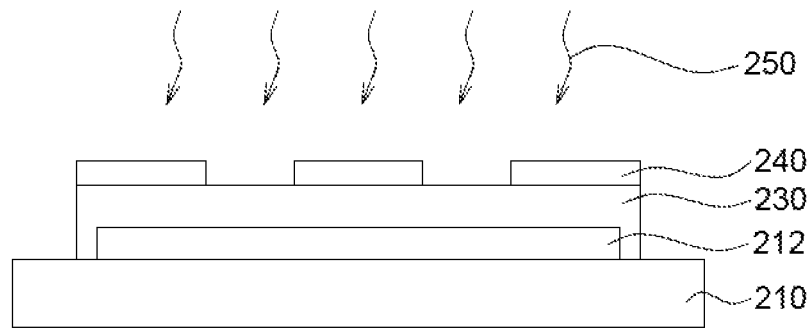
Figure 3F:
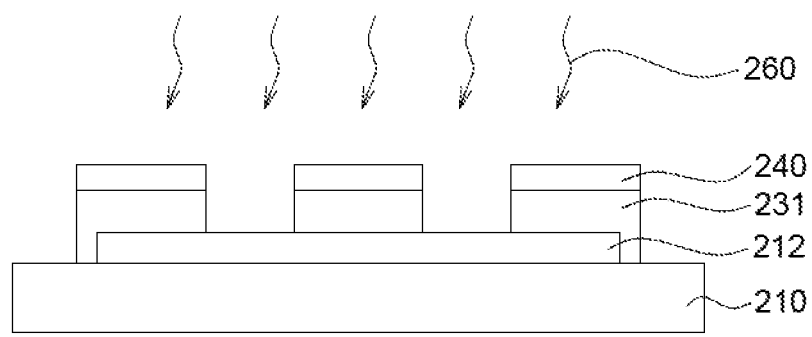
Figure 3G:
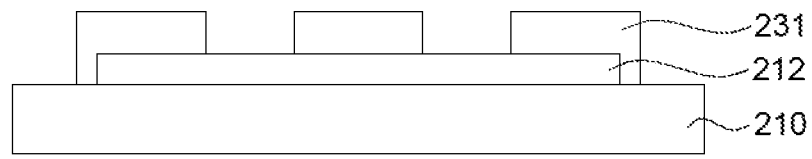

Referring to FIG. 3A, a release layer 212 is coated on a substrate 210. Referring to FIG. 3B, a material layer 230 of an optical waveguide formed by mixing the etchable closed-loop polyimide solution (BO) and 30% of the plate-shaped clay solution (CL) is coated on the substrate 210 by a spin coating process similar to that of the Embodiment 4 described above. Then, the material layer 230 of the optical waveguide is baked by a drying process similar to that of the Embodiment 4 described above. Referring to FIG. 3C, a patterned protective layer 240 is screen printed on the material layer 230 of the optical waveguide. The protective layer 240 is, for example, UV glue. Referring to FIG. 3D, the protective layer 240 is cured by exposing to UV light. Referring to FIG. 3E, a portion of the material layer 230 of the optical waveguide that is not covered by the protective layer 240 is removed by soaking in a first solvent 250 for 1 minute. The first solvent 250 is, for example, an alkaline etching solution prepared by mixing potassium hydroxide (KOH) and ethanolamine at a ratio of 4:1. Referring to FIG. 3F, the protective layer 240 is removed by using a second solvent 260. The second solvent 260 is, for example, a ketone or ether solvent. Referring to FIG. 3G, the patterned material layer 231 of the optical waveguide is obtained on the substrate 210.

Embodiment 7—Preparation of an Optical Waveguide

An unetchable closed-loop polyimide solution (BB) and 30% of a plate-shaped clay solution (CL) are mixed to from a lower clade layer. The lower clade layer is coated on the substrate by a spin coating process (at 500 rpm for 10 seconds), and then the lower clade layer is baked by a drying process similar to that in the Embodiment 4 described above. An etchable closed-loop polyimide solution (BO) is mixed with a 30% of the plate-shaped clay solution (CL) to form a core layer, and the core layer is coated on the lower clade layer by a spin coating process similar to that of the Embodiment 4 described above. Then the core layer is baked by a drying process similar to that in the Embodiment 4 described above. Next, the patterned protective layer is screen printed on the core layer. The protective layer is, for example, UV glue. After that, the protective layer is cured by exposing to UV light. Then, a portion of the core layer that is not covered by the protective layer is removed by using the first solvent to soak for 1 minute. The first solvent is, for example, an alkaline etching solution prepared by mixing potassium hydroxide (KOH) and ethanolamine in a ratio of 4 to 1. Then, the protective layer is removed by using a second solvent. The second solvent is, for example, a ketone or ether solvent. Next, an upper clade layer is prepared using the same formulation as the lower clade layer. The upper clade layer is spin coated (at 500 rpm for 10 seconds) over the lower clade layer and covers the patterned core layer. Then, the upper clade layer is baked using a drying process similar to that of the Embodiment 4 described above. Finally, the optical waveguide, for example, an optical waveguide 10 similar to that in FIG. 1F, including a three-layer structure of a lower clade layer, a core layer and an upper clade layer can be removed by using a blade to lightly cutting the edge of the optical waveguide.

The present disclosure provides an optical waveguide and a method for manufacturing the same. Since the polyimide included in the lower clade layer, the core layer and the upper clade layer of the present disclosure belongs to the closed-loop polyimide, the temperature of the drying process after coating the lower clade layer, the core layer and the upper clade layer can only be between 60° C. and 250° C., and does not need to be the same as that of the unclosed polyimide (for example, poly (acrylic acid), PAA). Therefore, the optical waveguide of the present disclosure is less vulnerable to high temperature and become yellowing and its light transmittance is better. Furthermore, the plate-shaped clay in the lower clade layer, the core layer and the upper clade layer of the present disclosure is capable of providing support between polyimide molecules, improving the chemical resistance, for example, the chemical structure and properties of itself may not be affected by the chemical solvent. Accordingly, it is possible to perform multi-layer coating and the refractive index can be adjusted by the adding amount of the plate-shaped clay. Therefore, the present disclosure not only provides a simple process (high processability), but also provides an optical waveguide with excellent chemical resistance and optical transmission.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical waveguide, comprising:
  a lower clad layer, having a composition comprising an unetchable closed-loop polyimide and a plate-shaped clay, wherein the plate-shaped clay of the lower clad layer is between 20 wt % and 60 wt %;
  a core layer, having a composition comprising an etchable closed-loop polyimide and a plate-shaped clay, wherein the plate-shaped clay of the core layer is between 20 wt % and 60 wt %; and
  an upper clad layer, having a composition comprising a polymer and a plate-shaped clay, wherein the plate-shaped clay of the upper clad layer is between 20 wt % and 60 wt %, the core layer is disposed between the lower clad layer and the upper clad layer, and the core layer has a refractive index lager than a refractive index of the upper clad layer and a refractive index of the lower clad layer.

2. The optical waveguide according to claim 1, wherein the polymer of the upper clad layer is selected from a group consisted of a closed-loop polyimide, epoxy, poly (acrylic acid), poly (methacrylic acid), poly (cyclic olefin), polysiloxane, and polyamide imide.

3. The optical waveguide according to claim 1, wherein the unetchable closed-loop polyimide has a following repeating unit of Formula 1:

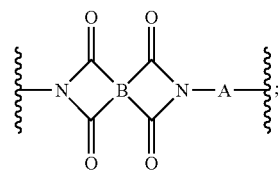

Formula 1 wherein, in Formula 1, A is

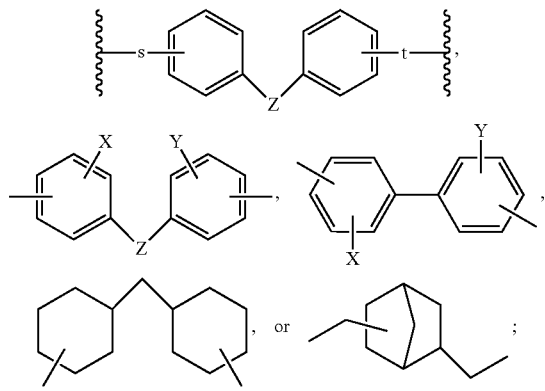

s and t are —O—Ar—, —CH$_2$—Ar—, —C(CH$_3$)$_2$—Ar—, or —SO$_2$—Ar—, respectively; Z is —O—, —(CR$_2$)$_m$—, —(CH$_2$)$_p$—C(CR$_3$)$_2$—(CH$_2$)$_q$— or —SO$_2$—; R is hydrogen (H) or fluorine (F); m, p and q are integers of 0-10; X and Y are (H), C$_1$-C$_{10}$ alkyl, trifluoromethyl, hydroxy, C$_1$-C$_{10}$ alkoxy, halogen, —O—Ar, —CH$_2$—Ar, —C(CH$_3$)$_2$—Ar, or —SO$_2$—Ar, respectively; and wherein, in Formula 1, B is

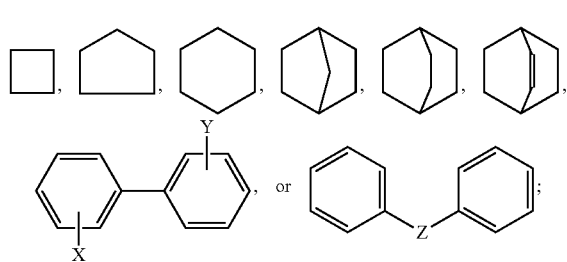

X and Y are H, C$_1$-C$_{10}$ alkyl, trifluoromethyl, C$_1$-C$_{10}$ alkoxy, halogen, respectively; Z is —O—, —(CR$_2$)$_m$—, —(CH$_2$)$_p$—C(CR$_3$)$_2$—(CH$_2$)$_q$—, —SO$_2$—, —Ar—O—Ar—, —Ar—CH$_2$—Ar—, —Ar—C(CH$_3$)$_2$—Ar—, or —Ar—SO$_2$—Ar—; R is H or F; m, p and q are integers of 0-10; Ar is a benzene ring.

4. The optical waveguide according to claim 3, wherein A has following structures:

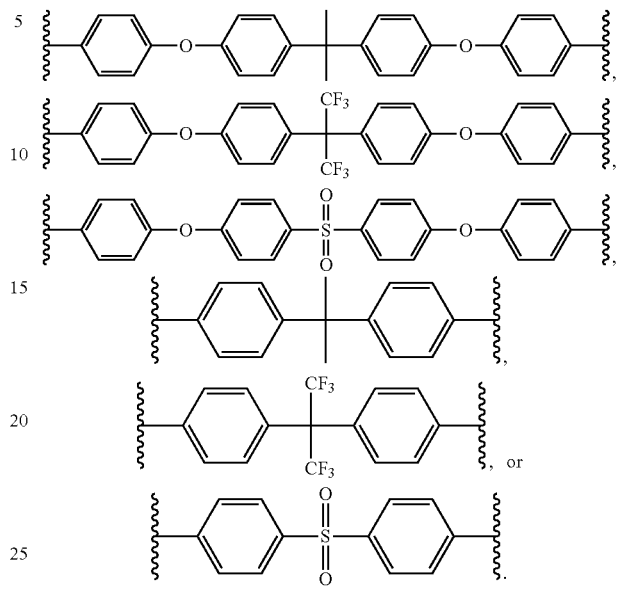

5. The optical waveguide according to claim 3, wherein an average molecular weight of the unetchable closed-loop polyimide is between 100,000 and 200,000.

6. The optical waveguide according to claim 1, wherein the etchable closed-loop polyimide has a following repeating unit of Formula 2:

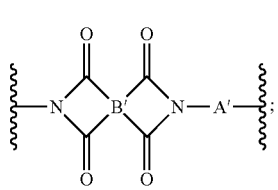

Formula 2 wherein A' is

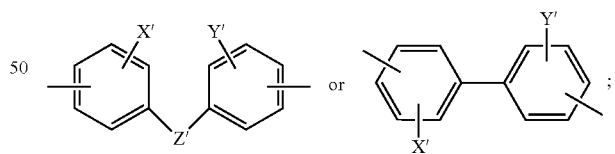

X' and Y' are H, C$_1$-C$_{10}$ alkyl, trifluoromethyl, hydroxy, C$_1$-C$_{10}$ alkoxy, halogen, —O—Ar, —CH$_2$—Ar, —C(CH$_3$)$_2$—Ar, or —SO$_2$—Ar, respectively; Z' is —O—, —(CR$_2$)$_m$—, —(CH$_2$)$_p$—C(CR$_3$)$_2$—(CH$_2$)$_q$— or —SO$_2$—, and at least one of X' and Y' is hydroxyl; R is H or F; m, p and q are integers of 0-10; and B' is

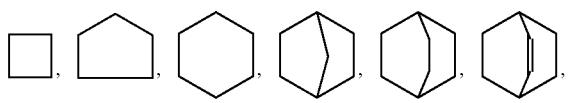

-continued

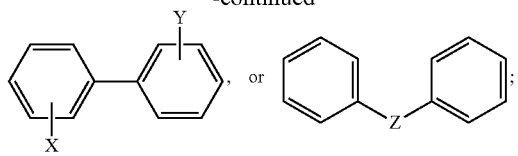

wherein X and Y are H, $C_1$-$C_{10}$ alkyl, trifluoromethyl, hydroxy, $C_1$-$C_{10}$ alkoxy, halogen, respectively; Z is —O—, —$(CR_2)_m$—, —$(CH_2)_p$—$C(CR_3)_2$—$(CH_2)_q$—, —$SO_2$—, —Ar—O—Ar—, —Ar—$CH_2$—Ar—, —Ar—$C(CH_3)_2$—Ar—, or —Ar—$SO_2$—Ar—; R is H or F; m, p and q are integers of 0-10; Ar is a benzene ring; and wherein B' is

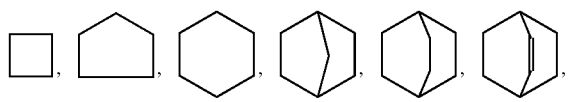

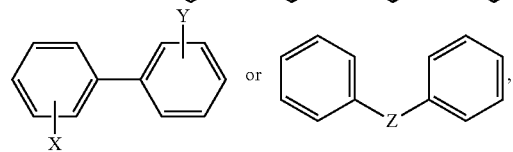

X and Y are H, $C_1$-$C_{10}$ alkyl, trifluoromethyl, hydroxy, $C_1$-$C_{10}$ alkoxy, halogen, respectively; Z is —O—, —$(CR_2)_m$—, —$(CH_2)_p$—$C(CR_3)_2$—$(CH_2)_q$—, —$SO_2$—, —Ar—O—Ar—, —Ar—$CH_2$—Ar—, —Ar—$C(CH_3)_2$—Ar— or —Ar—$SO_2$—Ar—; R is H or F; m, p and q are integers of 0-10; Ar is a benzene ring.

7. The optical waveguide according to claim 6, wherein A' has following structures:

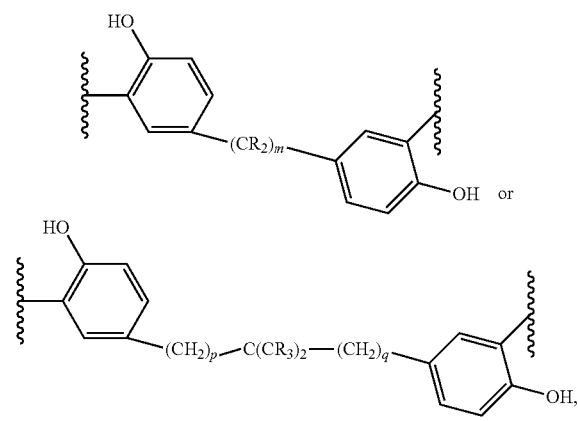

wherein R is H or F; m, p and q are integers of 0-10.

8. The optical waveguide according to claim 1, wherein the etchable closed-loop polyimide has following repeating units of Formula 2 and Formula 3:

Formula 2

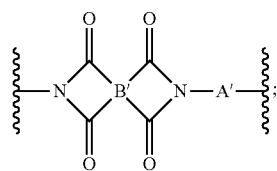

Formula 3

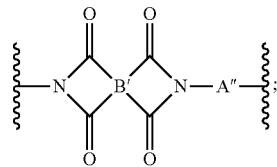

wherein, A' is

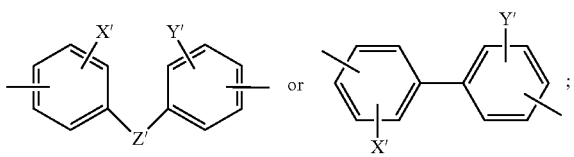

wherein X' and Y' are H, $C_1$-$C_{10}$ alkyl, trifluoromethyl, hydroxy, $C_1$-$C_{10}$ alkoxy, halogen, —O—Ar, —$CH_2$—Ar, —$C(CH_3)_2$—Ar, or —$SO_2$—Ar, respectively; Z' is —O—, —$(CR_2)_m$—, —$(CH_2)_p$—$C(CR_3)_2$—$(CH_2)_q$— or —$SO_2$—, and at least one of X' and Y' is hydroxyl; R is H or F; m, p and q are integers of 0-10; and A" is

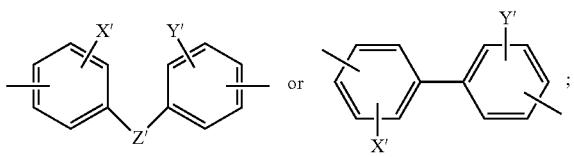

wherein X" and Y" are H, $C_1$-$C_{10}$ alkyl, trifluoromethyl, hydroxy, $C_1$-$C_{10}$ alkoxy, halogen, —O—Ar, —$CH_2$—Ar, —$C(CH_3)_2$—Ar, or —$SO_2$—Ar, respectively; Z" is —O—, —$(CR_2)_m$—, —$(CH_2)_p$—$C(CR_3)_2$—$(CH_2)_q$— or —$SO_2$—, and at least one of X" and Y" is hydroxyl; R is H or F; m, p and q are integers of 0-10;

wherein, B' is

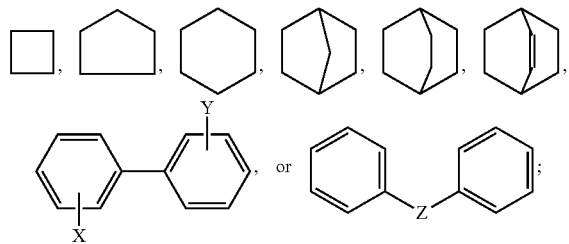

wherein X and Y are H, $C_1$-$C_{10}$ alkyl, trifluoromethyl, hydroxy, $C_1$-$C_{10}$ alkoxy, halogen, respectively; Z is —O—, —$(CR_2)_m$—, —$(CH_2)_p$—$C(CR_3)_2$—$(CH_2)_q$—, —$SO_2$—, —Ar—O—Ar—, —Ar—$CH_2$—Ar—, —Ar—$C(CH_3)_2$—Ar—, or —Ar—$SO_2$—Ar—; R is H or F; m, p and q are integers of 0-10; Ar is a benzene ring.

9. The optical waveguide according to claim 6, wherein A" has a following structure:

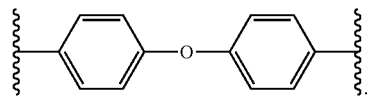

10. The optical waveguide according to claim 5, wherein an average molecular weight of the etchable closed-loop polyimide is between 100,000 and 200,000.

11. The optical waveguide according to claim 1, wherein a size of the plate-shaped clay is between 20 nm and 300 nm, and the ratio of the diameter to the thickness of the plate-shaped clay is between 50 and 10,000.

12. The optical waveguide according to claim 1, wherein a content of the plate-shaped clay of the core layer is smaller than a content of the plate-shaped clay of the lower clad layer, and is smaller than a content of the plate-shaped clay of the upper clad layer.

13. The optical waveguide according to claim 1, wherein a difference between a refractive index of the lower clad layer and a refractive index of the core layer is between 0 and 0.1.

14. The optical waveguide according to claim 1, wherein the upper clad layer and the lower clad layer has a same material composition.

15. A method for manufacturing an optical waveguide, comprising:
  providing a lower clad layer, wherein the lower clad layer has a composition including an unetchable closed-loop polyimide and a plate-shaped clay, and the plate-shaped clay of the lower clad layer is between 20 wt % and 60 wt %;
  coating a core layer on the lower clad layer, wherein the core layer has a composition including an etchable closed-loop polyimide and a plate-shaped clay, and the plate-shaped clay of the core layer is between 20 wt % and 60 wt %;
  etching the core layer; and
  coating an upper clad layer on the lower clad layer and covering the core layer, wherein the upper clad layer has a composition including a polymer and a plate-shaped clay, the plate-shaped clay of the upper clad layer is between 20 wt % and 60 wt %,
  wherein the core layer has a refractive index lager than a refractive index of the upper clad layer and a refractive index of the lower clad layer.

16. The method according to claim 15, wherein a drying process is performed respectively after steps of coating the lower clad layer, coating the core layer and coating the upper clad layer, and the drying process has a temperature between 60° C. and 250° C.

* * * * *